3,117,988
PROCESS FOR PURIFICATION OF
ACRYLONITRILE
William T. Bolleter, Texas City, Tex., assignor to Monsanto Chemical Company, St. Louis, Mo., a corporation of Delaware
No Drawing. Filed May 23, 1960, Ser. No. 31,238
4 Claims. (Cl. 260—465.9)

The present invention relates to the process for the purification of acrylonitrile. More particularly, the present invention relates to a process for the removal of hydrogen cyanide from acrylonitrile.

In the process of preparing acrylonitrile by reacting acetylene and hydrogen cyanide such impurities as hydrogen cyanide, lactonitrile, and acetaldehyde are found in the product. The removal of any one or all of these substances is generally tedious and very difficult. Such methods as distillation, countercurrent water washing treatment with copper oxide, iron sulfates, etc., have been used to purify product acrylonitrile.

When crude acrylonitrile is purified by means of distillation, a complete removal of the above-mentioned impurities is not accomplished. During distillation lactonitrile easily undergoes decomposition as soon as the temperature is raised above 50° C. On decomposition HCN and acetaldehyde are formed. On the other hand, both of these components re-combine to form lactonitrile, and an equilibrium is reached as follows:

$$CH_3CHOHCN \rightleftharpoons CH_3HCO + HCN$$

The distilled product is once more contaminated with HCN, acetaldehyde, and lactonitrile.

It is an object of this invention to provide a process for the purification of acrylonitrile. It is a more specific object of this invention to provide a method for the removal of hydrogen cyanide from product acrylonitrile. Additional objects will become apparent from the description of the invention herein disclosed.

In fulfillment of the objects of this invention it has been found that when product acrylonitrile containing impurities comprising hydrogen cyanide, acetaldehyde, and lactonitrile is subjected to treatment with an excess of a salt of a metal from the right hand column of group II of the periodic table, e.g., zinc, cadmium, mercury, a stable group IIB metal cyanide complex is formed which can be separated with the removal of the free HCN and the HCN bound as lactonitrile. The acrylonitrile and acetaldehyde are readily removed and separated by distillation. The HCN may then be recovered from the stable complex by addition of HCl to form the chloride of the metal. The metal salts prefered in the practice of this invention are the salts of mercury.

To illustrate the effectiveness of this invention, the following examples are given. It is to be understood, of course, that these examples are not to be construed in any manner as limiting the applications, conditions, or operation of the invention herein disclosed.

*Example I*

One hundred milliliters of acrylonitrile containing five parts per million of hydrogen cyanide were placed in a 250 milliliter distillation flask. A small mount of sodium acetate was added to the solution to promote dissociation of lactonitrile. To this was added 0.02 gram of mercuric acetate. The mixture was then flash distilled. An analysis of the distillate showed the total cyanide concentration (free hydrogen cyanide plus lactonitrile) to be less than one part per million.

*Example II*

One hundred milliliters of acrylonitrile containing approximately 3.5 weight percent of hydrogen cyanide is placed in a 250 milliliter distillation flask. To this is added five milliliters of an aqueous solution that is 2 M in sodium acetate and 0.02 M in mercuric acetate. The mixture is then flash distilled to remove acrylonitrile and acetaldehyde. Analysis of the distillate indicated less than 500 parts per million hydrogen cyanide.

*Example III*

One hundred milliliters of a crude acrylonitrile sample containing five parts per million of hydrogen cyanide and five parts per million of acetaldehyde is placed in a distillation flask. To this is added two milliliters of an aqueous solution containing 0.05 gram sodium acetate and 0.02 gram of mercuric acetate. The mixture is distilled and the acetaldehyde and acrylonitrile removed as distillate. An analysis of the distillate indicated less than one part per million hydrogen cyanide.

*Example IV*

On hundred milliliters of acrylonitrile containing five parts per million hydrogen cyanide is placed in a 250 milliliter distillation flask. A small amount of sodium carbonate is added to the solution to promote dissociation of lactonitrile. To this was added 0.02 gram of zinc acetate. The mixture was then flash distilled. An analysis of the distillate showed the total cyanide concentration (free hydrogen cyanide plus lactonitrile) to be less than 1.5 parts per million.

The compounds which may be used as complexing agents for the cyanide are the salts of metals of the right hand column of group II of the periodic table. The metals included in this group are zinc, cadmium, and mercury. It is, of course, necessary that the compound be sufficiently soluble to give a metal ion concentration adequate to complex all of the cyanide present as hydrogen cyanide and lactonitrile. In the practice of this invention, the salts of mercury are the preferred reactants for complexing the cyanide. Non-limiting examples of group IIB metal salts which may be used in the practice of this invention are acetates, nitrates, and sulfates. The preferred concentration of group IIB metal salt present, assuming complete solubility is 1 to 20 parts by weight of metal salt pre part by weight of HCN.

In the practice of this invention it is beneficial to carry out the complexing reaction in a slightly alkaline solution, although not necessary. This promotes the dissociation of lactonitrile so that all of the hydrogen cyanide may be removed from the acrylonitrile. Practically any compound may be used to bring about the desired alkalinity with the limitation being that the compound be one which will not interfere in any way with the complexing reaction. Examples of such compounds are sodium carbonate, sodium acetate, sodium hydroxide, and sodium borate. The amount of the alkaline compound added must, of course, be sufficient to catalyze the dissociation of lactonitrile and may range from 0.1 mg. to 10 mg. per gram of lactonitrile present.

What is claimed is:

1. A process of purifying acrylonitrile containing hydrogen cyanide and lactonitrile as impurities which comprises removing said impurities by treating the impure acrylonitrile in the presence of 0.1 to 10 mg. of an alkaline compound per gram of lactonitrile present, with a salt of a metal selected from the group consisting of metal acetates, metal sulfates and metal nitrates, the amount of said salt used being in a weight ratio to HCN of 1:1 to 20:1, said metal being one selected from the group consisting of zinc, cadmium and mercury.

2. The process of claim 1 wherein the metal is mercury.
3. The process of claim 1 wherein the metal is zinc.
4. The process of claim 1 wherein the metal salt is an acetate.

References Cited in the file of this patent

UNITED STATES PATENTS

| | | |
|---|---|---|
| 2,351,157 | Semon | June 13, 1944 |
| 2,656,376 | Martino | Oct. 20, 1953 |
| 2,784,219 | Couvillon | Mar. 5, 1957 |
| 2,838,559 | Muller | June 10, 1958 |